United States Patent [19]
Migchels et al.

[11] Patent Number: 6,072,004
[45] Date of Patent: Jun. 6, 2000

[54] THERMOFUSIBLE ELASTOMER COMPOSITIONS

[75] Inventors: Peter Migchels, London, United Kingdom; Margaret Ann Burns Clawson, Houston, Tex.

[73] Assignee: Shell Oil Company, Houston, Tex.

[21] Appl. No.: 09/199,304

[22] Filed: Nov. 25, 1998

Related U.S. Application Data

[60] Provisional application No. 60/068,129, Dec. 19, 1997.

[51] Int. Cl.[7] .............................. C08F 8/00; C08L 23/04
[52] U.S. Cl. ..................... 525/191; 525/232; 525/236; 525/237; 525/240; 525/241
[58] Field of Search ..................................... 525/191, 232, 525/236, 237, 240, 241

[56] References Cited

U.S. PATENT DOCUMENTS

| | | | |
|---|---|---|---|
| 5,112,900 | 5/1992 | Buddenhagen et al. | 524/484 |
| 5,158,851 | 10/1992 | Fuller et al. | 430/106 |
| 5,215,846 | 6/1993 | Fuller et al. | 430/106 |
| 5,238,998 | 8/1993 | Fuller et al. | 525/98 |
| 5,324,611 | 6/1994 | Fuller et al. | 430/106 |
| 5,596,042 | 1/1997 | Itoh et al. | 525/98 |
| 5,863,978 | 1/1999 | Vosters | 524/505 |

FOREIGN PATENT DOCUMENTS

| | | |
|---|---|---|
| 0488021 A1 | 6/1992 | European Pat. Off. . |
| 07096529 | 4/1995 | Japan . |
| 07096532 | 4/1995 | Japan . |
| WO 97/30839 | 8/1997 | WIPO . |
| WO 98/06774 | 2/1998 | WIPO . |
| WO 98/21270 | 5/1998 | WIPO . |

*Primary Examiner*—Nathan M. Nutter
*Attorney, Agent, or Firm*—Donna Blalock Holguin

[57] ABSTRACT

The present invention provides a thermofusible elastomer composition comprising:

(a) 100 phr of a selectively hydrogenated block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are between about 3,000 and about 7,000 and the monoalkenyl arene content of the multiblock copolymer is between about 7% and about 22% by weight;

(b) 20 to 50 phr of at least one high melt flow polyolefin;

(c) 0 to 19 phr of a plasticizing oil selected from naphthenic oils and paraffinic oils; and (d) 0 to 40 phr of at least one poly(conjugated diene) block compatible resin wherein the elastomer composition has a particle size of 1400 μm or less.

This composition is used in low shear processes.

8 Claims, No Drawings

THERMOFUSIBLE ELASTOMER COMPOSITIONS

This application claims the benefit of U.S. Provisiional Application Ser. No. 60/068,129, filed Dec. 19, 1997, the entire disclosure of which is hereby incorporated by reference.

FIELD OF THE INVENTION

The present invention relates to thermofusible elastomer compositions having a particle size of 1400 µm or less and to the use of these compositions for low shear processing.

BACKGROUND OF THE INVENTION

Elastomer compositions for thermofusible powders have been used in low shear processing techniques such as rotational molding, slush molding, powder coating, powder scatter coating, flame coating and fluidized bed coating. These compositions are often based on elastomers with high levels of plasticising oil through in order to obtain the desired low melt viscosity. The use of oil results in better processability and a decrease in hardness. Problems have been encountered when elastomer compositions that contain high levels of oil are used due to the high temperatures commonly associated with low shear processing (typically greater than about 260° C.). For example, bleed out can occur, fuming at or even below the application temperature can occur and physical properties can be effected. Furthermore, in some instances inconsistent quality of the composition after application may be experienced.

It would be advantageous to have an elastomer composition that can be used in low shear processing which contains little or no oil and has a low viscosity since low viscosity is very important for low shear processing. If the composition is too viscous, when processed at high temperatures, good melt and a continuous layer of melded compound will not be achieved.

SUMMARY OF THE INVENTION

The present invention provides a thermofusible elastomer composition comprising:
(a) 100 phr of a selectively hydrogenated block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are between about 3,000 and about 7,000 and the monoalkenyl arene content of the multiblock copolymer is between about 7% and about 22% by weight;
(b) 20 to 50 phr of at least one polyolefin;
(c) 0 to 19 phr of a plasticizing oil selected from naphthenic oils and paraffinic oils; and
(d) 0 to 40 phr of at least one poly(conjugated diene) block compatible resin wherein the elastomer composition has a particle size of 1400 µm or less.

DETAILED DESCRIPTION OF THE INVENTION

The composition of the present invention, broadly classified as an elastomer composition for use in low shear processes, is a new and useful composition which may be used as a thermofusible powder or thermofusible micropellet in powder and/or micropellet processing techniques such as rotational molding, powder coating, powder scatter coating, flame coating and fluidized bed coating or as a low viscosity hot melt to be applied via hot melt nozzle coating, roll coating, or knife coating. By adding a dusting agent to the composition, a free flowing thermofusible powder or micropellet is achieved.

By using specific polymers having a medium to high molecular weight with an inherent low melt viscosity, at least one polyolefin and optionally at least one poly(conjugated diene) block compatible resin in the thermofusible elastomer composition, it is possible to dramatically reduce or completely eliminate the level of plasticizing oil used thereby providing a composition which functions effectively in low shear processing.

The present invention provides an elastomer composition for low shear processes comprising:
(a) 100 phr of a selectively hydrogenated block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are between about 3,000 and about 7,000 and the monoalkenyl arene content of the multiblock copolymer is between about 7% and about 22% by weight;
(b) 20 to 50 phr of at least one polyolefin;
(c) 0 to 19 phr of a plasticizing oil selected from naphthenic oils and paraffinic oils; and
(d) 0 to 40 phr of at least one poly(conjugated diene) block compatible resin.

As used herein the phrase "thermofusible elastomer composition" means an elastomer composition in the form of a powder or micropellet of which the particles consist of a composition containing at least components (a) and (b) as defined hereinbefore and optionally (d) and/or a dramatically reduced level of (c).

As used herein, the term "phr" refers to parts by weight per 100 parts by weight of rubber, i.e., block copolymer.

The size of the powder particles or micropellet particles is expressed in terms of the particle's diameter. In general, this size is determined by sieving and is independent of the shape of the particle. The particle size is primarily determined by the desired end use and in most instances, will be 1400 µm or less. For instance, if a thin, smooth coating is desired, the particle size should be relatively small compared to the particle size used to prepare a thicker layer or coating whereby the smoothness of the surface is not critical. In general, when larger particle sizes are desired, micropellets having a particle size of 1400 µm or less, preferably of 1200 µm or less, more preferably from about 500 µm to about 1200 µm, even more preferably from about 700 µm to about 1000 µm are used. In general, when smaller particle sizes are desired, powders having a particle size less than 500 µm, preferably from 100 µm to 400 µm, more preferably from about 150 µm to 350 µm are used.

Block Copolymers

The elastomeric block copolymers suitable for use herein are a block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weights of the A and A' blocks are between about 3,000 and about 7,000 and the monoalkenyl arene content of the multiblock copolymer is between about 7% and about 22% by weight. As used herein, the phrase "substantially completely hydrogenated" means that at least 95% of the olefinic unsaturation is hydrogenated. Preferably at least 98% of the olefinic unsaturation is hydrogenated.

The phrase "block copolymer component" comprises the combination of a multiblock copolymer, as hereinafter defined, and an A'B' two block copolymer. The weight ratio of the multiblock copolymer to the A'B' two block copolymer is about 80:20 to about 25:75, preferably about 80:20 to about 40:60 and even more preferably about 75:25 to about 65:35. The multiblock copolymers employed in the present invention may have a variety of geometrical structures, since the invention does not depend on any specific geometrical structure, but rather upon the chemical constitution of each of the polymer blocks. Thus, the structures may be linear, radial or branched so long as each multiblock copolymer has at least two polymer end blocks A and at least one polymer mid block B as defined above. Methods for the preparation of such polymers are known in the art. In general, the method suitable for the preparation of the block copolymers is by anionic polymerization such as described in U.S. Pat. No. 3,231,635, U.S. Pat. No. 4,764,572, U.S. Pat. No. 5,376,745, U.S. Pat. No. 5,391,663, U.S. Pat. No. 5,393,843, U.S. Pat. No. 5,405,911, and U.S. Pat. No. 5,416,168, each incorporated herein by reference, followed by hydrogenation.

When solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

wherein R is an aliphatic, cycloaliphatic, aromatic, or alkyl-substituted aromatic hydrocarbon radical having from 1 to about 20 carbon atoms; and n is an integer of 1 to 4.

In addition to sequential techniques to obtain triblocks, tetrablocks, and higher orders of repeating structures, anionic initiators can be used to prepare diblocks of styrene-polydiene having a reactive ("live") chain end on the diene block which can be reacted through a coupling agent to create, for example, $(S-D)_xY$ structures wherein x is an integer from 2 to about 30, Y is a coupling agent, D is a diene monomer and greater than 65 percent of S-D diblocks are chemically attached to the coupling agent. Y usually has a molecular weight which is low compared to the polymers being prepared and can be any of a number of materials known in the art, including halogenated organic compounds; halogenated alkyl silanes; alkoxy silanes; various esters such as alkyl and aryl benzoates, difunctional aliphatic esters such as dialkyl adipates and the like; polyfunctional agents such as divinyl benzene (DVB) and low molecular weight polymers of DVB. Depending on the selected coupling agent the final polymer can be a fully or partially coupled linear triblock polymer (x=2), i.e., S-D-Y-D-S or branched, radial or star configurations. The coupling agent, being of low molecular weight, does not materially affect the properties of the final polymer. DVB oligomer is commonly used to create star polymers, wherein the number of diene arms can be 7 to 20 or even higher.

It is not required in coupled polymers that the diblock units all be identical. In fact, diverse "living" diblock units can be brought together during the coupling reaction giving a variety of unsymmetrical structures, i.e., the total diblock chain lengths can be different, as well as the sequential block lengths of styrene and diene.

Since the number of S-d polymeric arms in a star polymer can be large, the number average molecular weights of star polymers within the invention can be much larger than those of linear S-D-S polymers, i.e., up to 500,000 or higher. Such higher molecular weight polymers have the viscosity of lower molecular weight linear polymers and thus are processable in spite of the high molecular weight.

The block copolymers are hydrogenated. In general, the hydrogenation or selective hydrogenation of the polymer may be accomplished using any of the several hydrogenation processes known in the prior art. For example the hydrogenation may be accomplished using methods such as those taught, for example, in U.S. Pat. No. 3,113,986, U.S. Pat. No. 3,634,594, U.S. Pat. No. 3,670,054, U.S. Pat. No. 3,700,633 and U.S. Pat. No. 4,226,952, the disclosure of which patents are incorporated herein by reference. The methods known in the prior art and useful in the present invention for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising an iron group metal atom, particularly nickel or cobalt, and a suitable reducing agent such as an aluminum alkyl. The polymers are hydrogenated in such a manner as to produce hydrogenated polymers having a residual unsaturation content in the polydiene block of less than about 20 percent, and preferably as close to 0 percent as possible of their original unsaturation content prior to hydrogenation. A titanium catalyst such as disclosed in U.S. Pat. No. 5,039,755, incorporated herein by reference, may also be used in the hydrogenation process. A particularly preferred catalyst is a mixture of nickel 2-ethylhexanoate and triethylaluminum.

In general, the hydrogenation will be accomplished in a suitable solvent at a temperature within the range from about 20° C. to about 100° C. and at a hydrogen partial pressure within the range from about 100 psig to about 5,000 psig, preferably about 100 psig to 1,000 psig. Catalyst concentrations within the range from about 10 ppm (wt) to about 500 ppm (wt) of iron group metal based on total solution are generally used and contacting at hydrogenation conditions is generally continued for a period of time within the range from about 60 to about 240 minutes. After the hydrogenation is completed, the hydrogenation catalyst and catalyst residue will, generally, be separated from the polymer.

It will be understood that both blocks A and B may be homopolymer copolymer blocks, random copolymer blocks or tapered copolymer blocks as long as each block predominates in at least one class of the monomers characterizing the blocks and as long as the A blocks individually predominate in monoalkenyl arenes and the B blocks individually predominate in dienes. As used herein, the term "predominate" refers to amounts greater than 50%, preferably from about 65 to about 100%, more preferably from about 85 to about 100% and even more preferably from about 90 to about 100%. The term "monoalkenyl arene" will be taken to include especially styrene and its analogs and homologs including alphamethylstyrene and ring-substituted styrenes, particularly ring-methylated styrenes. The preferred monoalkenyl arenes are styrene and alphamethylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 65 percent of the condensed butadiene units in the butadiene polymer block have 1,2-configuration, as measured by a standard NMR technique. Thus, when such a block is hydrogenated, the resulting product is, or resembles, a regular copolymer block of ethylene and butene-1 (EB). Most preferably, the 1,2 content is about 40%. If the conjugated diene employed is isoprene, the resulting hydrogenated product is or resembles a regular copolymer block of ethylene and propylene (EP).

The number average molecular weights (as determined by GPC) of the individual blocks are very important aspects of the present invention and may vary only within certain limits. In most instances, the monoalkenyl arene blocks will have number average molecular weights in the order of 3,000 to 7,000, preferably 4,500 to 6,000, while the conjugated diene blocks either before or after hydrogenation will have average molecular weights in the order of 30,000 to 500,000, preferably 40,000 to 500,000, even more preferably 75,000 to 200,000. The total average molecular weight of the multiblock copolymer is typically in the order of 35,000 to about 500,000, preferably from about 45,000 to about 400,000, and depends upon geometry of the polymer. The diene block molecular weight is effectively set by the limitations on monoalkenyl arene block molecular weight and the weight percentage of monoalkenyl arene along with the geometry of the copolymer.

The proportion of the monoalkenyl arene blocks should be between about 7 and 22% by weight of the multiblock copolymer, preferably between about 10 and 18% by weight.

The chemical composition and molecular weight ranges of the A' and B' blocks of the A'B' two block copolymer are typically the same as the A and B blocks of the multiblock copolymer. The A'B' two block copolymer may be prepared in a separate synthesis process or may be prepared along with the multiblock copolymer by controlling coupling efficiency. The control of coupling efficiency is disclosed in U.S. Pat. No. 4,096,203.

When used herein, the term "molecular weight" is the molecular weight as measured by gel permeation chromatography (GPC) where the GPC system has been appropriately calibrated with polystyrene standards. The polymer in anionically polymerized linear polymers is essentially monodispersed and it is both convenient and adequately descriptive to report the peak molecular weight of the narrow molecular weight distribution observed. Such methods are well known and described in patents including U.S. Pat. No. 5,229,464, incorporated herein by reference. Since styrene (as polystyrene) is used as the calibration standard, the measurement directly gives the absolute molecular weight of the styrene endblocks. Knowing the molecular weight and percentage of styrene present, the absolute molecular weight of the midblock segment can be calculated. The molecular weight is measured on an aliquot, which is removed after the first step of the polymerization and then terminated to deactivate the initiator.

Polyolefins

The composition of the present invention also contains at least one high melt flow polyolefin in an amount from about 20 phr to about 50 phr. The polyolefins used in the present invention must be polyolefins which are capable of being processed with the block copolymers of the present invention under the conditions necessary to prepare the composition and process the pellets or microgranuals. This includes polyolefins which when blended with the elastomeric block copolymer(s) are capable of withstanding a combination of shear and elevated temperature. For example, the composition must be such that it would withstand typical conditions of a compound extruder. In particular, preferred polyolefin materials include polyethylene, polypropylene and polybutylene, including ethylene copolymers, copolymers that are substantially ethylene, propylene copolymers, copolymers that are substantially propylene, butylene copolymers and copolymers that are substantially butylene. In the most preferred embodiments, the polyolefin will be polypropylene homopolymers. Blends of two or more of the polyolefins may be utilized. The polyolefins will typically have a peak molecular weight greater than about 10,000, preferably from about 10,000 to about 75,000 more preferably from about 10,000 to about 50,000 and a high melt flow index. As used herein, the phrase "high melt flow" refers to polyolefins having a melt flow index greater than 50 g/10 min. at 190° C. and 2.16 kg wt (ASTM D1238). Preferably the high melt flow index is from 75 to 4000 g/10 min at 190° C. and 2.16 kg wt and more preferably from 100 to 3000 g/10 min at 190° C. and 2.16 kg wt. Those of ordinary skill in the art will recognize that in some instances, the melt flow index of certain polyolefins (e.g., polypropylene) is measured at 230° C. and 2.16 kg (ASTM D1238) rather than at 190° C. and 2.16 kg. Such polyolefins, even though measured at 230° C., must still have a melt flow index greater than 50 g/10 min. at 190° C. and 2.16 kg wt. and are still considered to be within the scope of the present invention A variety of suitable polyolefins are also available commercially, such as, PETROTHENE® NA601 (a low molecular weight, low density polyethylene having a melt index of 2000 g/10 min at 190° C. and 2.16 kg as calculated using equivalent values correlated from the melt flow rates obtained with ASTM D 1238 at conditions of 125° C. and 2.16 kg, 1996 brochure, 4402/E4646/1296, commercially available from Quantum Chemical Corp.), PETROTHENE® NA605 (a low molecular weight, low density polyethylene having a melt index of 4000 g/10 min at 190° C. and 2.16 kg as calculated using an equivalent melt index (EMI) from the formula $EMI=2.7\times10^7$ [viscosity(cP@150° C.)]$^{-1.047}$ ASTM D1238, 1996 brochure, 4402/E4646/1296, commercially available from Quantum Chemical Corp.), ProFlow® 3000 (a polypropylene copolymer having a melt index of 2600 g/10 min when measured in accordance with ASTM D1238 at 230° C. and 2.16 kg, commercially available from polyVISIONS, Inc.) and ProFlow® 1000 (a polypropylene homopolymer having a melt index of 2600 g/10 min when measured in accordance with ASTM D1238 at 230° C. and 2.16 kg, commercially available from polyVISIONS, Inc.).

Plasticizing Oils

The composition of the present invention optionally contains a plasticizing oil. The plasticizing oil is present in an amount from about 0 phr to 19 phr. The plasticizing oils of the present invention, when included, are selected from both naphthenic and paraffinic oils. Examples of suitable plasticizing oils include, but are not limited to, paraffinic oils such as DRAKEOL® 34 (specific gravity of 0864–0.878 at 60° F., a flashpoint of 460° F. and a viscosity of 370–420 SUS at 100° F.) and DRAKEOL® 35 (each commercially available from Penreco Company), TUFFLO® 6056 (commercially available from Atlantic Richfield Company)

and HYDROBRIGHT® 380PO (commercially available from Witco, Petroleum Specialties Group) and naphthenic oils such as SHELLFLEX® 371 and SHELLFLEX® 451 (each commercially available from Shell Oil Company) and TUFFLO® 6204 (commercially available from Penreco Company). As noted, the oil is either completely omitted or is present in an amount up to 19 phr. Preferably, the plasticizing oil is present in an amount from 0 phr to 10 phr, more preferably from 0 phr to 4 phr. In the most preferred embodiments, the plasticizing oil is completely omitted from the composition. Plasticizing oils, when used, should be capable of being processed with the other components of the composition without causing degradation.

Poly(conjugated diene) Block Compatible Resins

The resins used in the present invention are those that are compatible with the hydrogenated poly(conjugated diene) block, typically referred to as mid-block compatible resins. As the hydrogenated poly(conjugated diene)block compatible resins, any resin known to be applicable to this purpose can be used. Preferably the softening point range for the poly(conjugated diene block) compatible resin ranges from 75° C. to 150° C., more preferably from 100° C. to 145° C. and even more preferably from 110° C. to 140° C. Particularly suitable resins include rosin and rosin derivatives, polyterpenes, coumarone indenes, hydrogenated and partially hydrogenated resins and hydrocarbon resins, for example: alpha pinene-based resins, beta pinene-based resins, limonene-based resins, piperylene-based hydrocarbon resins, aromatic modified dicyclopentadiene based hydrocarbon resins, and aromatic modified di-terpene and tri-terpene resins. The resins, when included are present in an amount up to 45 phr, preferably, when included, the resins are present in an amount from about 20 phr to about from 40 phr, even more preferably from about 25 phr to about 35 phr. A variety of suitable resins are available commercially, including, but not limited to, REGALREZ® 1126OB (10 poise melt viscosity at 182° C.), REGALREZ® 1139 (10 poise melt viscosity at 212° C.), REGALREZ® 1085 and REGALREZ® 1126 (each commercially available from Hercules), the Akron P Series (commercially available from Arakawa) and the Sylvatac Series (commercially available from Sylvachem).

Compounding

The compositions of the present invention may also contain one or more additional conventional ingredients such as, dusting agents, fillers, blowing agents, antioxidants, UV stabilizers, slip agents, flame retardants and the like. When additional ingredients are present, the composition will comprise, in addition to the components set forth above, a minor amount of the one or more additional ingredients. As used herein, the term "minor amount" means less than 5% by weight of the total composition, preferably less than 2% by weight of the total composition. It should be noted that several of the materials listed below may be present in larger quantities than 2% or 5% by weight. For example, fillers such as calcium carbonate may be present in amounts up to about 30% by weight.

The dusting agent, when used, is a very fine powder having on average a particle size between 1 nm and 100 μm, preferably between 5 nm and 10 μm. By using a dusting agent, an elastomer composition which is free flowing can be obtained. As used herein the term "free flowing elastomer composition" refers to an elastomer composition of the present invention which contains a dusting agent and in which the particles of the composition do not adhere to one another. In principle any such fine powder may be employed but it is preferred that a silica or calcium carbonate powder is used. Examples of commercially available silica powders include, but are not limited to, AEROSIL® R972 (average particle size about 16 nm), AEROSIL® 200 (average particle size about 12 nm), SIPERNAT®, DUROSIL®, DUREX® and ULTRASIL® (average particle size about 16 nm). Examples of commercially available calcium carbonate powders include, but are not limited to, DURCAL® 5 (average particle size about 6 μm) and MILLICARB® (average particle size about 3 μm). The dusting agent is typically used in an amount of from about 0.1 to about 5% by weight, preferably from about 1 to about 3% by weight, based on total weight of the composition.

Suitable fillers which may be included in the present invention include, but are not limited to calcium carbonate, aluminum silicate, clays, talcs, silic and the like. Also very useful are reground polymeric waste, such as for instance vulcanized rubber powder, recycled polyurethane or recycled carpets. Calcium carbonate, aluminum oxide (alumina), magnesium hydroxide, barium sulphate and silica are particularly useful as the filler material. Of these, calcium carbonate and silica are the most preferred.

As noted above the present invention may also contain a blowing agent. Normally a blowing agent decomposes above a certain temperature thereby releasing gas, such as nitrogen, which causes a volume increase of the reaction mass. The temperature at which the blowing agent starts decomposing is further referred to as the activation temperature. Generally known blowing agents are for instance azodicarbonamide-based compound and diphenyloxide-4, 4'-disulphohydrazide. The later is commercially available under the trade name GENITRON OB®, while the azodicarbonamide-based compounds are commercially available as GENITRON EPE®, EPA® and EPB®.

The compositions of the present invention can readily be prepared by any of the methods known in the art for processing elastomer compositions. Examples of apparatus which may be used to process the compositions of the present invention include, but are not limited to, single or multiple screw extruders, mixing rollers, Brabender internal mixers, Banbury mills, kneaders and the like. For example, the compositions of the present invention can be prepared by dry mixing all of the components, with the exception of any dusting agent and/or blowing agent. Dry mixing the components may consist of rolling, tumbling or blending the components. The dry mixed components are then compounded by introducing the mixture into an extruder or mixing apparatus having heating and shearing means.

In an alternative embodiment, each of the components are separately metered into an extruder or mixing apparatus separately such that the metering rate is matched to the proportion of components desired in the final compound.

The components are processed at a temperature from about 160° C. to about 250° C., preferably from about 180° C. to 225° C., until a homogenous blend is obtained. The time that the components are mixed will depend upon the manner in which the components are mixed. For example, when the components are mixed using an internal mixer they are typically mixed for 5 to 10 minutes versus when an extruder is used the residence time is typically 1 to 5 minutes.

When the compositions are prepared through the use of a mixer, once thoroughly mixed, the molten composition can be spread into thin sheets and cooled. Cooling may be accomplished in any number of manners including by air or by passing the molten material through water. Once cooled, the thin sheets are then cut into small slices before being further processed.

When the compositions are prepared through the use of an extruder, once thoroughly mixed, the molten mixture is either extruded and directly cooled by water or is extruded and cooled by passing the mixture through air and then into water.

The processed composition is then made into pellets or granules of the desired particle size. These pellets or granules can be further processed into a powder by grinding the pellets or granules using any apparatus known to those skilled in the art. Such apparatus include, but are not limited to, Micropul pulverizers, Abbe mills, Wiley mills and pin mills. Typically such grinding or milling is done at or below ambient temperature. The compositions may also be processed by cryogenic milling. Cryogenic milling of the granules or pellets may be performed through the conventional cryogenic milling techniques, wherein for instance liquid nitrogen often is used as the chilling medium. For less smaller particles, the granules or pellets may also be cryogenically milled using liquid carbon dioxide or freon as the chilling medium.

The composition preparation may be carried out in a batch, continuous, or semi-continuous manner.

The invention will be further illustrated by the following examples which are included for illustrative purposes only and is in no way intended to limit the present invention.

EXAMPLES

In the following examples and comparative examples, Polymer A comprises a 70 percent/30 percent by weight blend of a selectively hydrogenated triblock copolymer containing styrene endblocks having a molecular weight of 5,300 and a hydrogenated butadiene midblock having a molecular weight of 134,400 and a polystyrene content of 13% by weight and a selectively hydrogenated diblock containing a 5300 molecular weight styrene block and a 67,200 molecular weight hydrogenated butadiene block and a polystyrene content of 13% by weight. Polymer B comprises a 70 percent/30 percent by weight blend of a selectively hydrogenated triblock copolymer containing styrene endblocks having a molecular weight of 5,200 and a hydrogenated butadiene midblock having a molecular weight of 130,600 and a polystyrene content of 13% by weight and a selectively hydrogenated diblock containing a 5,200 molecular weight styrene block and a 65,300 molecular weight hydrogenated butadiene block and a polystyrene content of 13% by weight. Polymer A and Polymer B were produced via anionic polymerization utilizing a secondary butyllithium initiator and a difunctional aliphatic ester coupling agent followed by hydrogenation utilizing a triethylaluminum catalyst. In addition, the following components were used:

| GENERIC COMPONENT | SPECIFIC COMPONENT | DESCRIPTION |
| --- | --- | --- |
| RESIN | REGALREZ ® 1126OB | A mid-block compatible resin (selectively hydrogenated resin polymerized using styrenic based comonomers) having 10 poise melt viscosity at 182° C., commercially available from Hercules |
|  | REGALREZ ® 1139 | A mid-block compatible resin (selectively hydrogenated resin polymerized using styrenic based comonomers) having 10 poise melt viscosity at 212° C., commercially available from Hercules |
|  | KRISTALEX ® 3085 | An end-block compatible resin having 10 poise melt viscosity at 139° C., commercially available from Hercules |
|  | PICCOLASTIC ® A75 | An end-block compatible resin having 10 poise melt viscosity at 118° C., commercially available from Hercules |
| POLYOLEFINS | PETROTHENE ® NA601 | A low density, polyethylene polyolefin having a melt index of 2000 g/10 minutes (as described hereinbefore), commercially available from Quantum Chemical Corp. |
|  | PETROTHENE ® NA605 | A low density, polyethylene polyolefin having a melt index of 4000 g/10 minutes (as described hereinbefore), commercially available from Quantum Chemical Corp. |
|  | PROFLOW ® 1000 | A polypropylene homopolymer having a melt index of 2600 g/10 minutes (as determined using ASTM D1238 230° C., 2.16 kg), commercially available from polyVISIONS |
|  | PROFLOW ® 3000 | A polypropylene copolymer having a melt index of 2600 g/10 min (as determined using ASTM D1238 230° C., 2.16 kg), commercially available from polyVISIONS, Inc. |
| PLASTICISING OIL | DRAKEOL ® 34 | A paraffinic oil commercially available from Penreco Company |
| ANTIOXIDANT | IRGANOX ® 1010 | Hindered phenol commercially available from Ciba Gigy |

-continued

| GENERIC COMPONENT | SPECIFIC COMPONENT | DESCRIPTION |
|---|---|---|
| | ETHANOX ® 330 | Primary hindered phenol commercially available from Ethyl Corp. |
| SLIP AGENT | CRODAMIDE ® ER | An erucamide slip agent commercially available from Croda Universal, Inc. |
| FILLER | VICRON ® 25-11 | A calcium carbonate filler commercially available from Specialty Minerals, Inc. |

The components for each of the following examples were dry blended and then compounded in a Brabender mixing head for 3 to 5 minutes at 190° C. The examples were then removed from the mixing head and spread into a thin sheet. After cooling at room temperature for 24 hours, each example was then tested for viscosity by determining Rheological Measurements using the Bohlin Rheometer (commercially available from Bohlin Instruments, Inc.) as detailed below.

| Component | phr | % wt |
|---|---|---|
| Example 1 | | |
| POLYMER A | 100 | 62.07 |
| PETROTHENE ® NA601 | 31.94 | 19.82 |
| REGALREZ ® 1139 | 27.07 | 16.8 |
| IRGANOX ® 1010 | 0.26 | 0.16 |
| CRODAMIDE ® ER | 1.82 | 1.13 |
| Example 2 | | |
| POLYMER A | 100 | 62.07 |
| PETROTHENE ® NA601 | 31.94 | 19.82 |
| REGALREZ ® 1126OB | 27.07 | 16.8 |
| IRGANOX ® 1010 | 0.26 | 0.16 |
| CRODAMIDE ® ER | 1.82 | 1.13 |
| Example 3 | | |
| POLYMER A | 100 | 74.62 |
| PETROTHENE ® NA601 | 31.94 | 23.83 |
| IRGANOX ® 1010 | 0.26 | 0.19 |
| CRODAMIDE ® ER | 1.82 | 1.36 |
| Example 4 | | |
| POLYMER A | 100 | 62.07 |
| PETROTHENE ® NA605 | 31.94 | 19.82 |
| REGALREZ ® 1126OB | 27.07 | 16.8 |
| IRGANOX ® 1010 | 0.26 | 0.16 |
| CRODAMIDE ® ER | 1.82 | 1.13 |
| Example 5 | | |
| POLYMER A | 100 | 74.62 |
| PETROTHENE ® NA605 | 31.94 | 23.83 |
| IRGANOX ® 1010 | 0.26 | 0.19 |
| CRODAMIDE ® ER | 1.82 | 1.36 |
| Example 6 | | |
| POLYMER A | 100 | 54.85 |
| PROFLOW ® 1000 | 31.94 | 17.52 |
| REGALREZ ® 1139 | 27.07 | 14.85 |
| VICRON ® 25-11 | 21.29 | 11.68 |
| IRGANOX ® 1010 | 0.26 | 0.14 |
| CRODAMIDE ® ER | 1.82 | 1.0 |
| Example 7 | | |
| POLYMER A | 100 | 58.22 |
| PROFLOW ® 1000 | 31.94 | 18.6 |
| REGALREZ ® 1139 | 27.07 | 15.76 |
| VICRON ® 25-11 | 10.65 | 6.2 |
| IRGANOX ® 1010 | 0.26 | 0.15 |
| CRODAMIDE ® ER | 1.82 | 1.06 |
| Example 8 | | |
| POLYMER A | 100 | 62.07 |
| PROFLOW ® 1000 | 31.94 | 19.82 |
| REGALREZ ® 1126OB | 27.07 | 16.8 |
| IRGANOX ® 1010 | 0.26 | 0.16 |
| CRODAMIDE ® ER | 1.82 | 1.13 |
| Example 9 | | |
| POLYMER A | 100 | 62.08 |
| PROFLOW ® 1000 | 32 | 19.87 |
| REGALREZ ® 1139 | 27 | 16.76 |
| IRGANOX ® 1010 | 0.26 | 0.16 |
| CRODAMIDE ® ER | 1.82 | 1.13 |
| Example 10 | | |
| POLYMER A | 100 | 55.84 |
| PROFLOW ® 1000 | 32 | 17.67 |
| REGALREZ ® 1139 | 27 | 15.08 |
| VICRON ® 25-11 | 18 | 10.05 |
| IRGANOX ® 1010 | 0.26 | 0.15 |
| CRODAMIDE ® ER | 1.82 | 1.02 |
| Example 11 | | |
| POLYMER A | 100 | 68 |
| PETROTHENE ® NA601 | 37 | 25 |
| DRAKEOL ® 34 | 10 | 7 |
| IRGANOX ® 1010 | 0.2 | 0.1 |
| Example 12 | | |
| POLYMER A | 100 | 68 |
| PROFLOW ® 3000 | 37 | 25 |
| DRAKEOL ® 34 | 10 | 7 |
| IRGANOX ® 1010 | 0.2 | 0.1 |
| Example 13 | | |
| POLYMER A | 100 | 63 |
| PETROTHENE ® NA601 | 47.6 | 30 |
| REGALREZ ® 1126OB | 11 | 7 |
| IRGANOX ® 1010 | 0.2 | 0.1 |
| COMPARATIVE EXAMPLES | | |
| Comp. Example 1 | | |
| POLYMER A | 100 | 62.07 |
| PETROTHENE ® NA605 | 31.94 | 19.82 |
| KRISTALEX ® 3085 | 27.07 | 16.8 |
| IRGANOX ® 1010 | 0.26 | 0.16 |
| CRODAMIDE ® ER | 1.82 | 1.13 |
| Comp. Example 2 | | |
| POLYMER A | 100 | 62.07 |
| PETROTHENE ® NA601 | 31.94 | 19.82 |
| PICCOLASTIC ® A75 | 27.07 | 16.8 |
| IRGANOX ® 1010 | 0.26 | 0.16 |
| CRODAMIDE ® ER | 1.82 | 1.13 |

Rheological Measurements

In order to establish viscosity profiles for the examples made, the following tests were carried out. For each example to be tested, a one-inch diameter circular specimen (hereinafter disc) was cut from the example prepared. Each of the disc had a thickness of from 0.01 to 0.005 inches. The Bohlin Rheometer was set to perform a frequency sweep at a constant temperature of 190° C. The rheometer was set up in the plate/plate configuration and preheated to a temperature of 190° C. The oscillation program was chosen and an amplitude of 100% was selected. The frequencies were measured in Hertz and included: 0.01, 0.04, 0.08, 0.1, 0.5, 1.5, 5, and 10. (Note that these frequencies when converted to radians per second (R/S) correspond to 0.06 radians per second (R/S), 0.25 R/S, 0.5 R/S, 0.63 R/S, 3.14 R/S, 6.28 R/S, 31.4 R/S or 62.8 R/S). The rheometer plates were set to zero. The disc of the specimen to be tested was loaded into the rheometer and the temperature was allowed to come to 190° C. The disc was compressed until a gap of 1.1 mm was reached. Excess was removed with a spatula. The disc was compressed further until it bulged slightly from the plates. The final gap was entered into the computer and the sample chamber was allowed to reach 190° C. The upper plate shaft was then released and the run was started. After completed, the frequency measurements were converted from Hertz to Reciprocal Seconds (R/S). The viscosity results are reported in Pascal seconds (PAS) and may be found in the Table 1 below.

TABLE 1

| R/S | PAS | R/S | PAS | R/S | PAS | R/S | PAS |
|---|---|---|---|---|---|---|---|
| Example 1 | | Example 2 | | Example 3 | | Example 4 | |
| 0.06 | 880 | 0.06 | 1200 | 0.06 | 2100 | 0.06 | 420 |
| 0.25 | 830 | 0.25 | 1100 | 0.25 | 1900 | 0.25 | 410 |
| 0.5 | 810 | 0.5 | 1100 | 0.5 | 1700 | 0.5 | 410 |
| 0.63 | 810 | 0.63 | 1100 | 0.63 | 1700 | 0.63 | 400 |
| 3.14 | 720 | 3.14 | 1000 | 3.14 | 260 | 3.14 | 400 |
| 6.28 | 690 | 6.28 | 1000 | 6.28 | 46 | 6.28 | 400 |
| 31.4 | 460 | 31.4 | 720 | 31.4 | 5.4 | 31.4 | 370 |
|  |  | 62.8 | 560 | 62.8 | 4.4 | 62.8 | 210 |
| Example 5 | | Example 6 | | Example 7 | | Example 8 | |
| 0.06 | 2500 | 0.06 | 3300 | 0.06 | 2800 | 0.06 | 1200 |
| 0.25 | 2500 | 0.25 | 2500 | 0.25 | 2100 | 0.25 | 1100 |
| 0.5 | 2400 | 0.5 | 2200 | 0.5 | 1800 | 0.5 | 940 |
| 0.63 | 2300 | 0.63 | 2100 | 0.63 | 1800 | 0.63 | 890 |
| 3.14 | 1700 | 3.14 | 1500 | 3.14 | 1300 | 3.14 | 690 |
| 6.28 | 1500 | 6.28 | 1300 | 6.28 | 1000 | 6.28 | 660 |
| 31.4 | 710 |  |  | 31.4 | 110 | 31.4 | 430 |
| 62.8 | 37 |  |  | 62.8 | 41 | 62.8 | 210 |
| Example 9 | | Example 10 | | Example 11 | | Example 12 | |
| 0.06 | 3200 | 0.06 | 3100 | 0.06 | 1400 | 0.06 | 4000 |
| 0.25 | 2400 | 0.25 | 2400 | 0.25 | 1400 | 0.25 | 3000 |
| 0.5 | 2000 | 0.5 | 2000 | 0.5 | 1300 | 0.5 | 2600 |
| 0.63 | 1900 | 0.63 | 1900 | 0.63 | 1300 | 0.63 | 2500 |
| 3.14 | 1300 | 3.14 | 1400 | 3.14 | 1100 | 3.14 | 1700 |
| 6.28 | 1100 | 6.28 | 1200 | 6.28 | 930 | 6.28 | 1400 |
|  |  |  |  | 31.4 | 210 | 31.4 | 960 |
|  |  |  |  | 62.8 | 130 | 62.8 | 260 |
| Example 13 | | Comp. Example 1 | | Comp. Example 2 | | | |
| 0.06 | 1200 | 0.06 | 3500 | 0.06 | 25000 | | |
| 0.25 | 1100 | 0.25 | 3100 | 0.25 | 8300 | | |
| 0.5 | 1100 | 0.5 | 2700 | 0.5 | 4900 | | |
| 0.63 | 1000 | 0.63 | 2500 | 0.63 | 4100 | | |
| 3.14 | 900 | 3.14 | 1400 | 3.14 | 1500 | | |
| 6.28 | 820 | 6.28 | 1100 | 6.28 | 1200 | | |
| 31.4 | 580 |  |  | 31.4 | 13 | | |
| 62.8 | 440 |  |  | 62.8 | 0.98 | | |

As can be seen from the above results, the viscosity levels (in PAS) for the examples of the present invention at an R/S of 0.06 are almost all lower than the results achieved for the comparative examples. A low viscosity is an indication of the ability to successfully use the compositions in low shear processing. A low viscosity in conjunction with low shear rate is necessary for a material to be used in low shear processing. A successful use of a composition in low shear processing is considered to be a final product produced by low shear processing in which the particles of the composition are melded to one another in a continuous layer (i.e., containing no voids or pinholes).

Low Shear Processing Tests

The following low shear processing tests were performed using the following samples:

Example 14

| Component | phr | % wt |
|---|---|---|
| POLYMER B | 100 | 62.91 |
| PETROTHENE ® NA601 | 31.7 | 19.94 |
| REGALREZ ® 1126 | 27.06 | 17.02 |
| ETHANOX ® 330 | 0.2 | 0.13 |

This example was prepared in the same manner as set forth above with the exception that the composition was cryogenically ground to make a powder having a particle size of less than approximately 1000 μm. The cryogenic grinding was carried out by using a Mikso Pulverizer Cryogenic Mill. The sample was fed into a chamber and exposed to liquid nitrogen at a feed rate of 10 lbs./hour. The material was forced through a 20 mesh (0.03 inch) screen to produce the powder.

Example 15

| Component | phr | % wt |
|---|---|---|
| POLYMER A | 100 | 54.8 |
| PETROTHENE ® NA601 | 31.9 | 17.5 |
| REGALREZ ® 1126 | 27.1 | 14.8 |
| VICRON ® 25-11 | 21.3 | 11.7 |
| IRGANOX ® 1010 | 0.26 | 0.14 |
| CRODAMIDE ER ® | 1.82 | 1.0 |

This example was prepared in the same manner as set forth above with the exception that the composition was extruded in a Baker Perkins extruder to make micropellets having powder having a particle size of approximately 0.02 to 0.05 inches. This was done in a standard compounder using a die especially made for creating micropellets. The die holes are 0.02 inches in diameter which creates very thin strands to be cut into micropellets.

Comparative Example 3

This example has the same formulation as set forth in Example 14 above with the exception that the final composition was made into pellets having a particle size of approximately 0.25 inches.

Fluidized Bed Dipping

For fluidized bed processes, the powder used is placed in a bed through which air is passed upward. As a result, the powder is maintained in a fluidized state. To coat an object, the object is heated to above the melting point of the powder and dipped into the bed. The powder melts and adheres to the heated object, forming a continuous film. The dipped object is then subjected to a post cure in an oven set at approximately the melting point of the coating. After the post cure, the dipped object may be air cooled or quenched in water.

An amount of Example 14 (compounded powder) was dusted with 1% Aerosil® (fumed silica). The powder was then sieved through a 60 mesh screen to collect particles of less than 250 microns. The sieved portion (less than 250 microns) was placed in a small fluidized bed unit which was then activated by blowing air through the sample. Five aluminum plaques were heated for 15 minutes in an oven to 325° C. The plaques were removed, one at a time, and quickly dipped into the agitating powder inside the fluidized bed (timing indicated below). The dipped plaques were then post-cured inside the oven as detailed below.

The compound adhered tightly to the aluminum, thus making the skin very difficult to peel off. More specifically, plaque 1 was dipped for 30 seconds then post-cured at 325° C. for 2 minutes. The skin was very thick and somewhat yellowed. Plaque 2 was dipped for 10 seconds then post-cured for 1.5 minutes. The skin was 35–40 mil (0.035–0.040 inches) thick and somewhat yellowed. The inside surface was smooth while the outside surface was very rough. Plaque 3 was dipped for 1 second then post-cured for 1 minute. The skin was 12–15 mil thick and evidenced no pin holes. The inside surface was smooth while the outside surface was slightly rough.

The results showed that the example is capable of producing a continuous film such as that needed in commercial applications which use fluidized bed dipping (i.e., for making surgical gloves).

Rotational Molding

An amount of Example 14 was dusted with 1% Aerosil® (fumed silica) then sieved with a 16 mesh screen to separate particles of less than 1190 microns in size. The sieved portion was processed in a Ferry Industries Rotospeed Express rotational molder, using a three dimensional octagonal aluminum mold. A predetermined amount of Example 14 was deposited in one half of the mold. The mold was closed and rotated biaxially inside an oven. The plastic melted and formed a coating over the inside surface of the mold. The mold was then removed from the oven and cooled. The mold was opened and the hollow part removed and examined. The conditions used were as follows:

| Heat | | Cool | |
|---|---|---|---|
| Oven temperature | 600° F. | Fan Delay time | 2 min |
| Oven time | 30 min. | Fan time 1 | 7 min |
| Arm speed | 4 RPM | Spray time 1 | 1 min |
| Plate speed | 1 RPM | Fan time 2 | 3 min |
| Reversing time | 3 min | Mist time 1 | 1 min |
| Total oven time | 30 min | Fan time 3 | 3 min |
| Low gas time | 30 min | Fan time 4 | 3 min |
| | | Low gas time | 20 min |

The results showed bubbles present. The powder did not coat the mold evenly, thereby leaving thick spots and bare spots. The part stuck to the aluminum mold and could not be removed. While there were problems associated with this run, the overall results of the run demonstrate that rotational molding can be done with this formulation provided that run conditions and mold type are optimized. The problem of sticking can be overcome by using a mold release coating such as Silverstone®. The problem of uneven coating can be negated by modifying the parameters of the rotational molder.

Slush Molding

In slush molding, a mold of the object to be created is preheated to a temperature designed to melt the material to be used. The mold is then filled with the desired material and when a skin has formed in the mold, the excess material is poured out. The mold undergoes a post heating step to complete the formation of the skin. The mold is then air cooled or quenched in water and the part removed.

For slush molding testing, an amount of Example 15 (micropellets) was passed through sieves to get the following fractions:

Fraction 1—greater than 14 mesh (1410 microns and larger)

Fraction 2—less than 14 mesh and greater than 18 mesh (1399–1000 microns)

Fraction 3—less than 18 mesh and greater than 25 mesh (999–710 microns)

Fraction 4—less than 25 mesh (less than 710 microns)

Each fraction was then treated as follows: an oven was set to 340° C.; a SILVERSTONE® coated muffin tin was placed into the oven for 15 minutes; the muffin tin was removed and the sides were quickly coated with a sample of micropellets, then the tin was inverted to remove excess sample; the coated tin was then placed into the oven for a post-cure as indicated below; and the tin was then removed and placed into a bucket of cold water to quench the skin formation. The results showed:

A. Micropellets total fraction—post cure for 1 minute. Skin was extremely lacy with next to no continuity.

B. Micropellets fraction 1—post cure for 1 minute. Skin was very lacy, almost no pellet continuity.

C. Micropellets fraction 2—post cure for 45 seconds. Skin was very lacy, almost no pellet continuity.

D. Micropellets fraction 3—post cure for 45 seconds. Skin lacy, some particle continuity, some pellets not melted.

E. Micropellets fraction 4—post cure for 1 minute. Skin contains some holes, pellets had some continuity.

F. Micropellets ½ fraction 3+½ fraction 4—post cure for 1 minute. Skin contains some holes and has fair continuity.

G. Micropellets fraction 3—post cure for 1.5 minutes. Skin had very few holes, good continuity.

H. Micropellets ½ fraction 3+½ fraction 4—post cure for 2 minutes. Skin had almost no holes, good continuity, however, smelled degraded and had a yellowish color.

I. Micropellets ½ fraction 3+½ fraction 4—post cure for 1.5 minutes. Skin had almost no holes, good continuity and no signs of degradation.

J. Micropellets fraction 3—post cure for 1.5 minutes, however pellets were allowed to sit longer than typical before post cure. Skin had almost no holes, good continuity but some pellets were not melted on the bottom inside surface.

The overall results show that with the proper particle size and optimized procedure parameters, the example used is capable of forming a skin which is smooth and continuous.

Fusing

This method is dependent upon temperature to form the desired skin. It is used mostly in applications where the film formed will remain attached to the part (or mold) in which it is formed, for example, a seal on a jar or bottle lid. Powder or micropellets are placed in the desired position inside the part (or mold). The part, with the material, is then exposed to heat or infrared lighting until a smooth, continuous film is formed. The part is then removed to cool.

For this method, an amount of Example 14 (powder) was sieved through a 60 mesh screen. In addition to Example 14, Example 15 (micropellets) unsieved and sieved in the following fractions was used: Fraction 2—less than 14 mesh and greater than 18 mesh (1399–1000 microns); and Fraction 3—less than 18 mesh and greater than 25 mesh (999–710 microns). Comparative Example 3 was also included.

Amounts of each of the above were added to an unheated 2.5 inch diameter round aluminum pan in one of two ways: around the edge only or covering the entire bottom of the pan. In addition, the examples were cured in one of two ways: by placing the loaded pan in a press with plates set at 400° F. using no pressure or under an infared lamp. Details of the experiments and the results obtained are listed below:

Comparative Example 3 (pellets)

a. Pan edge covered, cured with infrared lamp—pellets melted after 7 minutes, making a smooth ring around the pan edge.

b. Pan edge covered, cured in press at 400° F.—pellets melted after 3.5 minutes, making a smooth ring around the pan edge.

c. Complete pan bottom covered, cured in press at 400° F.—pellets melted after 4 minutes. The skin contained no bubbles or voids, however pellet weld lines were evident.

Example 14 (powder sieved fraction)

a. Pan edge covered, cured with infrared lamp—powder melted after 4 minutes. The skin contained some bubbles, indicating incomplete particle overlap.

b. Pan bottom covered, cured in press at 400° F.—After 4 minutes, sample was removed. The skin was whitish over most of surface, indicating incomplete melting of the powder.

c. Pan bottom covered, cured in press at 400° F.—After 4 minutes, sample was removed and a weight was applied to the surface to press the skin. The skin was clear and smooth with very few bubbles.

Example 15 (micropellets, unsieved)

a. Pan edge covered, cured with infrared lamp—micropellets melted after 4 minutes. Skin had very irregular borders due to the different micropellet sizes, but the surface was smooth. It was not possible to check for the presence of bubbles because the formulation contained VICRON® 25-11 (calcium carbonate), which made the skin opaque.

b. Pan edge covered, cured in press at 400° F.—micropellets melted after 4 minutes. Skin had very irregular borders due to the different micropellet sizes, but the surface was smooth. It was not possible to check for the presence of bubbles because the formulation contained VICRON® 25-11 (calcium carbonate), which made the skin opaque.

Example 15 (micropellets, sieved <14 mesh & >18 mesh)

a. Pan edge covered, cured with infrared lamp—micropellets melted after 4 minutes. Skin had somewhat irregular borders due to the different micropellet sizes, but the surface was smooth. It was not possible to check for the presence of bubbles because the formulation contained VICRON® 25-11 (calcium carbonate), which made the skin opaque.

b. Pan edge covered, cured in press at 400° F.—micropellets melted after 4 minutes. Skin had somewhat irregular borders due to the different micropellet sizes, but the surface was smooth. It was not possible to check for the presence of bubbles because the formulation contained VICRON® 25-11 (calcium carbonate), which made the skin opaque.

Sample 15 (micropellets, sieved <-18 mesh & >25 mesh)

a. Pan edge covered, cured with infrared lamp—micropellets melted after 4 minutes. Skin had slightly irregular borders due to the different micropellet sizes, but the surface was smooth. It was not possible to check for the presence of bubbles because the formulation contained VICRON® 25-11 (calcium carbonate), which made the skin opaque.

b. Pan edge covered, cured in press at 400° F.—micropellets melted after 4 minutes. Skin had slightly irregular borders due to the different micropellet sizes, but the surface was smooth. It was not possible to check for the presence of bubbles because the formulation contained VICRON® 25-11 (calcium carbonate), which made the skin opaque.

These results show that with the proper particle size and optimized procedure parameters the examples are capable of forming a layer, which is smooth and continuous.

What is claimed is:

1. A thermofusible elastomer composition comprising:
   (a) 100 phr of a selectively hydrogenated block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are between about 3,000 and about 7,000 and the monoalkenyl arene content of the multiblock copolymer is between about 7% and about 22% by weight;
   (b) 20 to 50 phr of at least one high melt flow polyolefin;
   (c) 0 to 19 phr of a plasticizing oil selected from naphthenic oils and paraffinic oils; and
   (d) 0 to 40 phr of at least one poly(conjugated diene) block compatible resin wherein the elastomer composition has a particle size of 1400 μm or less.

2. The composition of claim 1 wherein the hight melt flow polyolefin has a melt flow index greater than 50 g/10 minutes at 190° C. and 2.16 kg wt.

3. The composition of claim 1 wherein the plasticizing oil is present in an amount from 0 to 10 phr.

4. The composition of claim 1 wherein the poly (conjugated diene) block compatible resin is present in an amount from 20 phr to 40 phr.

5. A thermofusible elastomer composition for low shear processes comprising:
   (a) 100 phr of a selectively hydrogenated block copolymer component comprising an A'B' block copolymer and a multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are between about 3,000 and about 7,000 and the monoalkenyl arene content of the multiblock copolymer is between about 7% and about 22% by weight;

(b) 20 to 50 phr of at least one high melt flow polyolefin;

(c) 0 to 19 phr of a plasticizing oil selected from naphthenic oils and paraffinic oils; and (d) 0 to 45 phr of at least one poly(conjugated diene) block compatible resin wherein the elastomer composition has a particle size of 1400 μm or less.

6. The composition of claim 5 wherein the hight melt flow polyolefin has a melt flow index greater than 50 g/10 minutes at 190° C. and 2.16 kg wt.

7. The composition of claim 5 wherein the plasticizing oil is present in an amount from 0 to 10 phr.

8. The composition of claim 5 wherein the poly (conjugated diene) block compatible resin is present in an amount from 20 phr to 40 phr.

* * * * *